(12) United States Patent
Shinojima et al.

(10) Patent No.: US 8,926,472 B2
(45) Date of Patent: Jan. 6, 2015

(54) CONTINUOUSLY VARIABLE TRANSMISSION FOR VEHICLE

(75) Inventors: Takumi Shinojima, Kanagawa (JP); Sachiko Noji, Kanagawa (JP); Hiromasa Nakamura, Saitama (JP)

(73) Assignees: NSK Ltd., Tokyo (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/979,941

(22) PCT Filed: Jan. 12, 2012

(86) PCT No.: PCT/JP2012/050477
§ 371 (c)(1),
(2), (4) Date: Sep. 27, 2013

(87) PCT Pub. No.: WO2012/111364
PCT Pub. Date: Aug. 23, 2012

(65) Prior Publication Data
US 2014/0179480 A1 Jun. 26, 2014

(30) Foreign Application Priority Data
Feb. 15, 2011 (JP) ................................. 2011-029296

(51) Int. Cl.
*B60W 10/00* (2006.01)
*F16H 31/00* (2006.01)
(Continued)

(52) U.S. Cl.
CPC ............. *B60W 10/101* (2013.01); *F16H 59/06* (2013.01); *F16H 61/02* (2013.01); *B60W 10/12* (2013.01)
USPC .............. 477/39; 475/116; 475/118; 475/121

(58) Field of Classification Search
CPC .................... F16H 2061/00; F16H 2061/0481; F16H 2061/0485; F16H 2061/0488
USPC .............................. 477/39; 475/116, 118, 121
See application file for complete search history.

(56) References Cited

U.S. PATENT DOCUMENTS 6,217,473 B1 * 4/2001 Ueda et al. .................... 475/216
7,618,341 B2 * 11/2009 Shinojima ..................... 475/217
(Continued)

FOREIGN PATENT DOCUMENTS

JP 10-267118 10/1998
JP 2001-304306 10/2001
(Continued)

OTHER PUBLICATIONS

International Search Report dated Mar. 27, 2012 from the corresponding PCT/JP2012/050477.
(Continued)

*Primary Examiner* — Tisha Lewis
(74) *Attorney, Agent, or Firm* — Katten Muchin Rosenman LLP (57) ABSTRACT

Construction of a continuously variable transmission device for a vehicle is achieved that, when a shift lever is shifted to a selection position for a direction opposite the traveling direction at that time, it is capable of preventing the vehicle from continuing to travel at high speed in a direction opposite the direction intended by the operator. When the shift lever is shifted to a selection position of a direction opposite the traveling direction at that time, and the vehicle speed is faster than a specified speed ($V_1$), the connection of a clutch device that transmits power between a continuously variable transmission mechanism and a differential gear mechanism is disconnected, and the drive force from the drive source is prevented from being further transmitted to the wheels. As a result, it is possible to cause the vehicle to decelerate without accelerating even when the operator tries to move faster in the opposite direction, or when the operator steps on the accelerator pedal with the intention of accelerating in the opposite direction, and thus it is possible to prevent the vehicle from continuing to travel at high speed in the direction opposite the intended direction of the operator.

3 Claims, 5 Drawing Sheets

(51) Int. Cl.
*B60W 10/101* (2012.01)
*F16H 59/06* (2006.01)
*F16H 61/02* (2006.01)
*B60W 10/12* (2012.01)

(56) References Cited

U.S. PATENT DOCUMENTS

2004/0204283 A1 10/2004 Inoue
2008/0058155 A1 3/2008 Sinojima
2012/0058854 A1* 3/2012 Shiozaki et al. ............. 475/204

FOREIGN PATENT DOCUMENTS

| JP | 2004-190809 | 7/2004 |
| JP | 2004-245326 | 9/2004 |
| JP | 2006-300268 | 11/2006 |
| JP | 3924164 B | 6/2007 |
| JP | 2007-187288 | 7/2007 |
| JP | 2007-309435 | 11/2007 |

OTHER PUBLICATIONS

Chinese Office Action dated Sep. 1, 2014 for the Corresponding Chinese Patent Application No. 201280004213.0.

* cited by examiner

CONTINUOUSLY VARIABLE TRANSMISSION FOR VEHICLE

TECHNICAL FIELD

The present invention relates to a continuously variable transmission for a vehicle that is used as an automatic transmission for a vehicle such as an automobile, or industrial vehicle such as a construction vehicle, farm vehicle and the like.

BACKGROUND ART

Multi-stage transmission devices having a multi-gear transmission mechanism (for example, 4 to 8 forward stages, and 1 to 2 reverse stages) in which the transmission gear ratio cannot be continuously adjusted during operation have been conventionally used as an automatic transmission (AT) for a vehicle. As this kind of multi-stage transmission, a transmission having a torque converter and planetary gear mechanism (typical torque converter AT), or an automated manual transmission (AMT) that automatically performs shifting operation (shift down, shift up) and clutch disconnecting/connecting operation of a multi-stage (manual) transmission by way of a hydraulic or an electric actuator that is controlled by a controller are known.

Moreover, the use of continuously variable transmissions (CVT) capable of continuously adjusting the transmission gear ratio, such as a belt continuously variable transmission and toroidal continuously variable transmission, have increased in recent years. Furthermore, infinitely variable transmissions (IVT), which are a combination of a continuously variable transmission such as toroidal continuously variable transmission and a differential gear mechanism (for example, a planetary-gear transmission), the transmission path of which can be freely switched by a clutch mechanism, and that make it possible to have an infinitely large transmission gear ratio, are also known. In a vehicle in which this kind of multi-stage transmission device or continuously variable transmission device is assembled, transmission control is performed in order to perform adjustment to the most optimum gear stage or transmission gear ratio (target gear stage, target transmission gear ratio) depending on the traveling state at that instant that is obtained from the accelerator pedal operation (accelerator opening) or the traveling speed of the vehicle (vehicle speed), and lock-up-clutch control of a torque converter, and necessary connecting/disconnecting control of the clutch is performed.

Incidentally, when driving a vehicle in which this kind of automatic transmission is installed, due to erroneous operation or intentional operation (knowingly performed) by the driver, the shift lever may be shifted to a selection position for a direction opposite the traveling direction of the vehicle at that instant. In other words, when the selection position of the shift lever is in the D range (normal forward position) or L range (high drive forward position), and the vehicle is traveling in the forward direction, the shift lever may be shifted and set in the R range (reverse position), or, on the other hand, when the selection position of the shift lever is in the R range and the vehicle is traveling in the reverse direction, the shift lever may be shifted and set in the D range or L range. Of this kind of operation, intentional (knowingly performed) operation by the driver is performed such as when putting the vehicle into a garage. In other words, when putting a vehicle into a garage, without the vehicle being in a completely stopped state, the shift lever may be shifted (garage shifting) from the "D range→N range→R range while traveling forward" or may be shifted from the "R range→N range→D range when traveling backward".

In an industrial vehicle such as a farm vehicle or construction vehicle, switching between forward and reverse is performed frequently during work, however, this kind of switching between directions may be performed by shifting the shift lever (shuttle shifting) to a selection position for a direction opposite the traveling direction of the vehicle at that instant. In that case, together with adjusting to the gear stage or transmission gear ratio that corresponds to the position where the shift lever is shifted to (shift position), and the clutch corresponding to that shift position is connected, the behavior of the vehicle changes suddenly such as sudden deceleration, tire lock, engine stall or the like, and when this change is severe, there is a possibility that damage to the vehicle or transmission device will occur such as breakage of the propeller shaft, damage to the inside of the transmission device, clutch burst or the like.

In consideration of such a situation, JP 2007-309435 (A) discloses technology that, in a continuously variable device that is a combination of a toroidal continuously variable transmission and a planetary gear transmission as described above, when the shift lever is shifted to a selection position for a direction opposite the traveling direction of the vehicle at that time, prevents sudden change in the behavior of the vehicle, and prevents damage to the vehicle and transmission device. More specifically, JP 2007-309435 (A) discloses technology that, when the shift lever is shifted to a selection position for a direction opposite the traveling direction of the vehicle at that time, keeps the speed ratio of the continuously variable transmission device at a value that corresponds to the traveling state at that time, and connects the clutch device, then adjusts the speed ratio to a value that makes it possible to achieve a stopped state of the vehicle.

However, in the continuously variable transmission disclosed in JP 2007-309435 (A), with the shift lever shifted to a selection position for a direction opposite the traveling direction of the vehicle at that time, releasing the connection of the clutch device is not taken into consideration. For example, in the case of industrial vehicles such as farm vehicles or construction vehicles, with the shift lever shifted to the direction opposite the traveling direction at that time, the operator may step on the accelerator pedal with the intention of traveling in the opposite direction as quickly as possible, or with the intention of accelerating in that opposite direction. Such operation (shuttle shifting) is performed frequently by the operator with the intention of quickly stopping the vehicle and quickly accelerating in the opposite direction. When this kind of operation is performed, in the continuously variable transmission device that is disclosed in JP 2007-309435 (A), the clutch device remains connected regardless of the traveling speed of the vehicle, so there is a possibility that the vehicle will continue to travel at high speed for a short time in the direction opposite the selected direction of the shift lever (direction opposite the direction intended by the operator). Therefore, it is not possible to achieve the behavior intended by the operator (quick stopping and acceleration), and there is a possibility that this will bring about a decrease in work efficiency. Moreover, this kind of vehicle behavior that differs from the intention of the operator gives an uncomfortable feeling to the operator, and is not preferable.

JP 2004-190809 (A) discloses technology in which, in order to prevent sliding between the belt and pulley in a belt continuously variable transmission when starting to move, the connection of a forward clutch and a reverse clutch is made smooth by adjusting the hydraulic pressure that is introduced into these clutches by a garage shifting control valve that is connected to the shift lever. Moreover, JP 3,924,164 (B2) discloses technology that prevents slipping between the belt and pulley in a belt continuously variable transmission by suitably regulating the force for holding the belt by the pulley by a garage shifting control valve when the shift lever is shifted to a selection position for the direction opposite the traveling direction of the vehicle at that time. However, in the continuously variable transmissions disclosed in this literature, the number of parts increases by providing a garage shifting control valve, as well as construction and control becomes more complicated, so there is a possibility that maintaining reliability will become troublesome.

JP 2006-300268 (A) and JP 2007-187288 (A) disclose technology in which a continuously variable transmission device that is used in construction vehicles or farm vehicles, and has modes in which the rotating state of the output shaft is switched between a forward state and reverse state that are on both sides of a so-called geared neutral (GN) state in which the rotating state of the output shaft is stopped while the input shaft continues to rotate in one direction. JP 2006-300268 (A) discloses technology in which the fluctuation range (transmission range) of the speed ratio on the forward side and on the reverse side is increased by providing a forward/reverse switching mechanism in such a continuously variable transmission device that is capable of achieving this kind of geared neutral state. Moreover, JP 2007-187288 (A) discloses technology that gradually increases the transmission gear ratio of a toroidal continuously variable transmission in order to travel in the direction corresponding to the operation direction of the forward/reverse switching lever. However, in the case of continuously variable transmission devices disclosed in the literature above, shifting the shift lever to a selection position for the direction opposite the traveling direction of the vehicle at that time (shuttle shifting) is not considered. Therefore, when this kind of operation is performed, there is a possibility that behavior (quick stopping and acceleration) will not be achieved as intended by the operator.

RELATED LITERATURE

Patent Literature

[Patent Literature 1] JP 2007-309435 (A)
[Patent Literature 2] JP 2004-190809 (A)
[Patent Literature 3] JP 3,924,164 (B2)
[Patent Literature 4] JP 2006-300268 (A)
[Patent Literature 5] JP 2007-187288 (A)

SUMMARY OF THE INVENTION

Problem to be Solved by the Invention

Taking the above situation into consideration, the object of the present invention is to achieve a continuously variable transmission device for an automobile having construction that is capable of preventing the vehicle from traveling at high speed in a direction opposite the direction intended by the operator when the shift lever is shifted to a selection position for a direction opposite the traveling direction of the vehicle at that time (when garage shifting or shuttle shifting is performed).

Means for Solving the Problems

The continuously variable transmission device for a vehicle of the present invention, as in the conventional construction, includes:

a continuously variable transmission mechanism;
a differential gear mechanism that includes a combination of a plurality of gears;
a clutch device that switches the power transmission path between the continuously variable transmission mechanism and the differential gear mechanism; and
a controller that switches the operation of the continuously variable mechanism, differential gear mechanism and clutch device, in which
by changing the relative displacement speed of the plurality of gears of the differential gear mechanism based on adjustment of the transmission gear ratio, which is the ratio between the input-side and output-side of the continuously variable transmission mechanism, it is possible to change the rotating state of the output shaft between a forward state and reverse state with a stopped state in between, with the input shaft rotating in one direction as is by the drive source.

The continuously variable transmission mechanism is a transmission that is capable of continuously adjusting the transmission gear ratio, and for example, is a toroidal continuously variable transmission or pulley continuously variable transmission. Moreover, the differential gear mechanism is, for example, a planetary gear transmission. Furthermore, it is possible to use an engine computer such as an engine control unit (ECU) as the controller.

Particularly, a feature of the present invention is that the controller has
a first function that, when a shift lever is shifted to a selection position for a direction opposite the traveling direction at that time, and with the clutch device connected, changes the speed ratio, which is the ratio between the input side and output side of the overall continuously variable transmission device, from a value that corresponds to the traveling state at that time, to "0" at which a stopped state can be achieved; and
a second function that, when the shift lever is shifted to a selection position for a direction opposite the traveling direction at that time, and when the traveling speed of the vehicle is faster than a specified speed, disconnects the clutch device.

Preferably, the controller, maintains the clutch device in a disconnected state while the traveling speed of the vehicle is faster than the specified speed, and then when the traveling speed of the vehicle becomes equal to or less than the specified speed, based on the first function, connects the clutch device and adjusts the speed ratio of the overall continuously variable transmission device to "0" at which a stopped state of the vehicle can be achieved.

Moreover, the present invention is suitably applied in the case where the continuously variable transmission mechanism is a toroidal continuously variable transmission. More specifically, the toroidal continuously variable transmission is used as the continuously variable transmission mechanism and is capable of switching between a low-speed mode (increasing the reduction ratio) and a high-speed mode (decreasing the reduction ratio) by switching a connected mode and a disconnected mode of the clutch device, in which the low-speed mode, by adjusting the transmission gear ratio of this toroidal continuously variable transmission and changing the relative displacement speed of the plurality of gears of the differential gear mechanism, is able to change the rotating state of the output shaft between a forward rotating state and reverse rotating state, with a stopped state in between and with the input shaft rotating in one direction as is by the drive source, and the high-speed mode, by changing the transmission gear ratio of the toroidal continuously variable transmission without changing the rotating state of the output shaft, changes the speed ratio of the overall continuously variable transmission device, and achieves a state in which the reduction ratio is smaller than in the low-speed mode.

Effect of the Invention

With the continuously variable transmission device for a vehicle of the present invention, it is possible to prevent a vehicle from continuing to travel at high speed in a direction opposite the intended direction of the operator when the shift lever has been shifted to a selection position for the direction opposite the traveling direction of the vehicle at that time (when garage shifting or shuttle shifting has been performed). Therefore, in such a case, it is possible to prevent sudden changes in the behavior of the vehicle (sudden deceleration, tire lock, engine stall and the like), it is possible to prevent damage to the vehicle and transmission device (damage to the propeller shaft, damage to the inside of the transmission device, clutch burst and the like), and it is possible to quickly and safely decelerate and stop the vehicle.

Particularly, with the present invention, in order to obtain the effects described above, unlike in the conventional construction, there is no increase in the number of parts, and control is not complex, so it becomes easier to ensure reliability. Moreover, because there is no need for complex control, it is possible to prevent the occurrence of control interference. Furthermore, it is possible to achieve behavior according to the operator's intentions, so it is possible to prevent operational error by the operator due to the intentions of the operator not matching the behavior of the vehicle.

MODES FOR CARRYING OUT THE INVENTION

FIG. 1 to FIG. 5 illustrate an embodiment of the present invention. In this example, a toroidal continuously variable transmission 4 is employed as the continuously variable transmission, and a planetary gear transmission 5 is employed as the differential gear mechanism; and by combining these, a continuously variable transmission device that is capable of achieving a so-called infinitely large transmission gear ratio (geared neutral (GN) state, a state with a speed ratio of 0) in which the output shaft 9 is stopped with the input shaft 3 remaining as is in a rotating state is constructed. As the continuously variable transmission mechanism, it is also possible to use other kinds of transmissions such as a pulley continuously variable transmission. Moreover, as the differential gear mechanism, it is possible to use a single-pinion planetary gear transmission, a double-pinion planetary gear transmission either alone, or in combination of a plurality of planetary gear transmissions.

Figure 1:
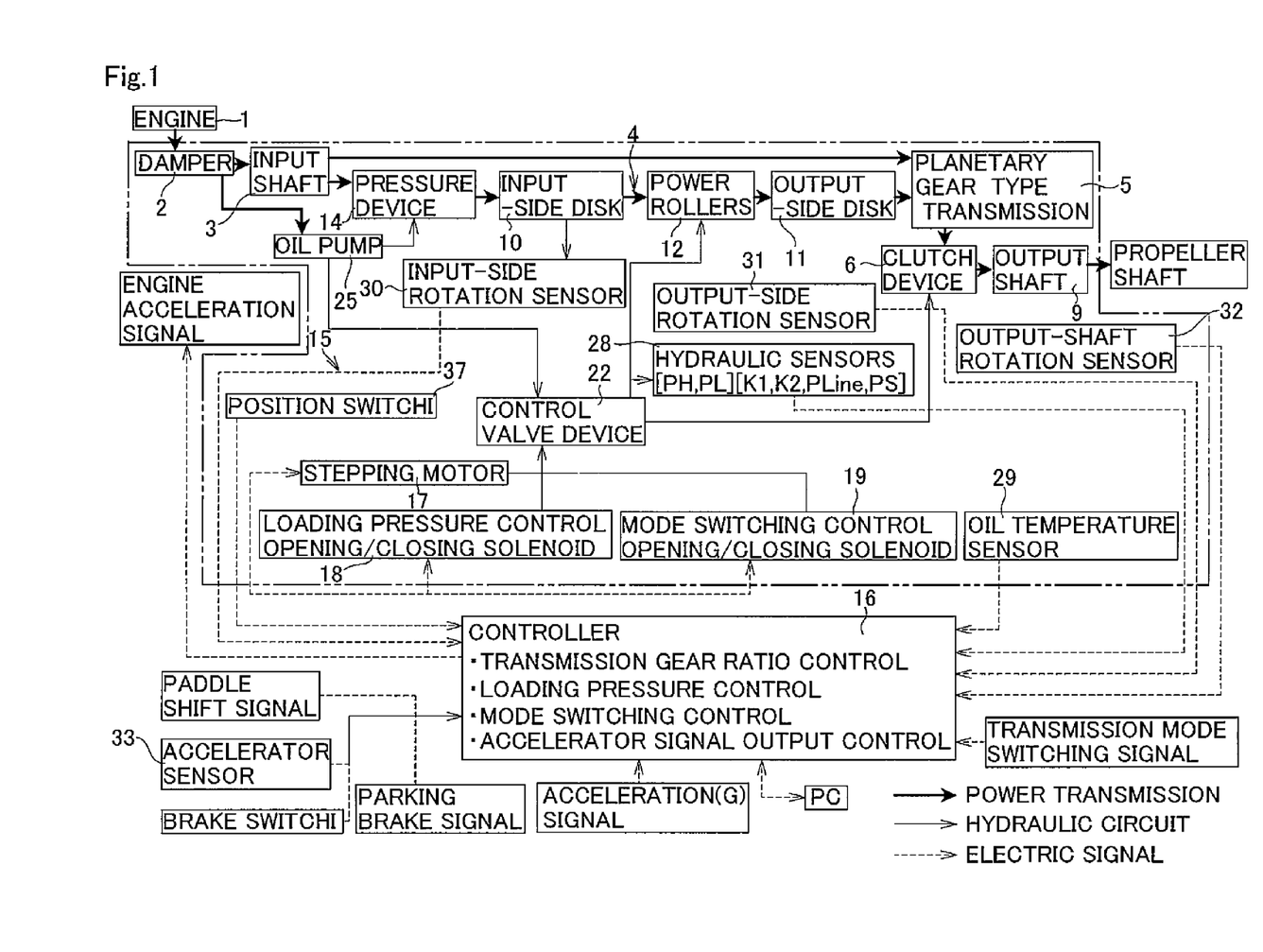
FIG. 1 is a block diagram of a continuously variable transmission device of an example of an embodiment of the present invention.
Figure 2:
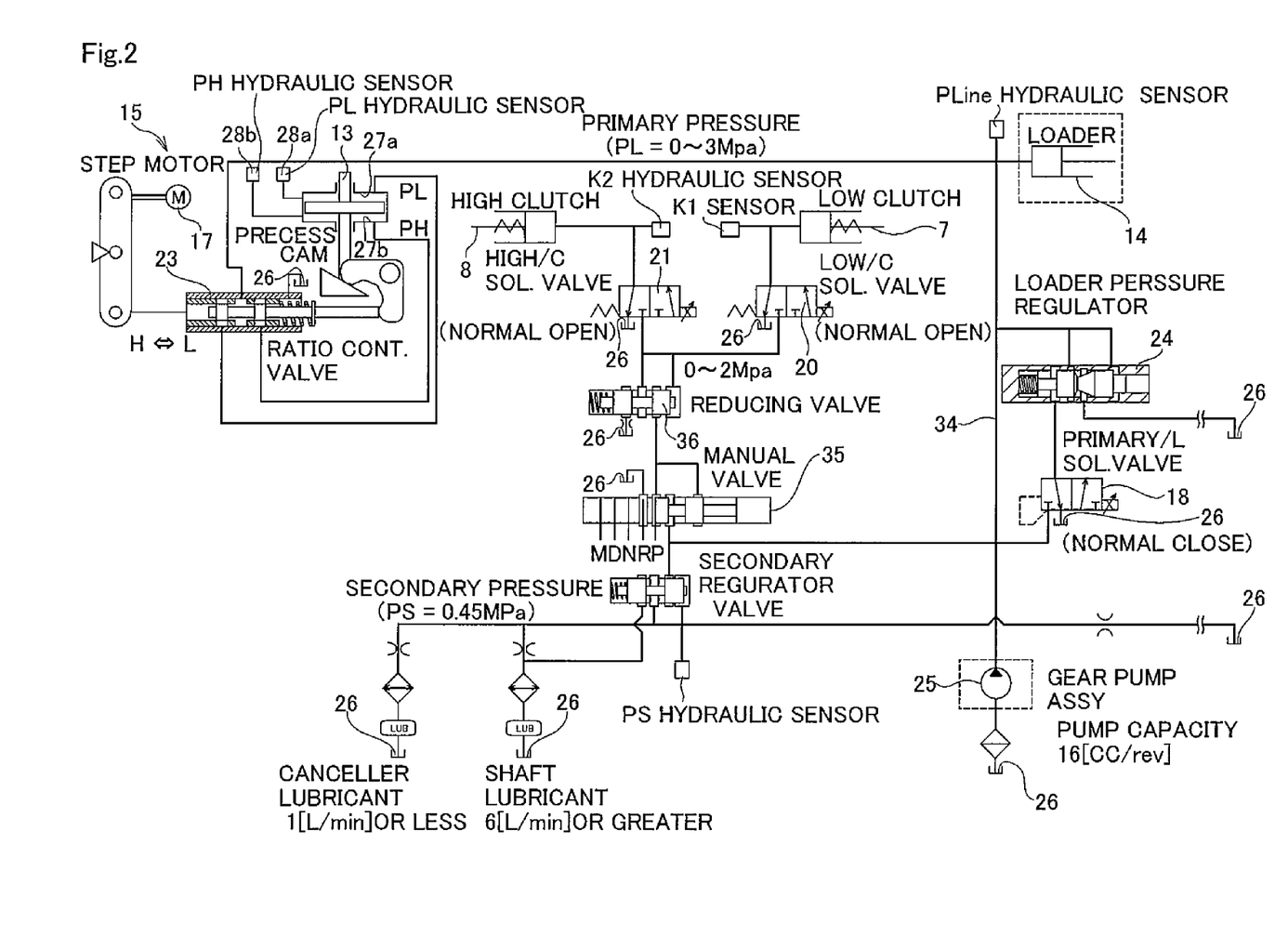
FIG. 2 is a drawing illustrating a hydraulic circuit that is employed in the continuously variable transmission device of this example.

FIG. 1 is a block diagram illustrating the continuously variable transmission device of this example. Moreover, FIG. 2 illustrates the hydraulic circuit for controlling the continuously variable transmission device of this example. In the case of this example, construction is such that when the shift lever is shifted to a selection position in the direction opposite the traveling direction at that time, the speed ratio of this kind of continuously variable transmission device is changed according to preset conditions.

The output from the engine 1 is inputted to the input shaft 3 by way of a damper 2. The power that is transmitted to this input shaft 3 is transmitted to the planetary gear transmission 5 directly or by way of the toroidal continuously variable transmission 4. Then, the differential components of the component member of this planetary gear transmission 5 are outputted to the output shaft 9 by way of a clutch device 6 (in FIG. 2, a low-speed clutch 7 and a high-speed clutch 8 are illustrated). Moreover, the toroidal continuously variable transmission 4 has an input-side disk 10, an output-side disk 11, a plurality of power rollers 12, a plurality of trunnions (not illustrated in the figure) that correspond as support members, an actuator 13 (see FIG. 2), a pressing device 14 and a transmission gear ratio control unit 15.

The input-side disk 10 and output-side disk 11 are arranged so as to be concentric with each other, and so as to be able to rotate relative to each other. The power rollers 12 are held between the inside surfaces of the input-side and output-side disks 10, 11 that face each other, and transmit power (force, torque) between these input-side and output-side disks 10, 11. The trunnions support the power rollers 12 so as to be able to roll freely. The actuator 13 is a hydraulic actuator, and causes the trunnions that support the power rollers 12 to displace in the axial direction of pivot shafts that are provided on both end sections thereof. The pressing device 14 is a hydraulic pressing device that generates a pressing force that is proportional to the hydraulic pressure that is introduced into the device, and this pressing device 14 presses the input-side disk 10 and output-side disk 11 in a direction toward each other. The transmission gear ratio control unit 15 controls the displacement direction and displacement amount of the actuator 13 in order to adjust the transmission gear ratio between the input-side disk 10 and the output-side disk 11 to a desired value.

In the case of this example in the figures, the transmission gear ratio control unit 15 has: a controller 16; a stepping motor 17 that is switched based on a control signal from the controller 16; a loading pressure control opening/closing solenoid 18; a mode switching control opening/closing solenoid 19 (in FIG. 2, this is illustrated as a low-speed clutch solenoid 20 and high-speed clutch solenoid 21); and a control valve device 22, the operating state of which is switched by these members 17 to 21. It is possible to use an engine computer such as an engine control unit (ECU) as the controller 16. Moreover, the transmission gear ratio control valve 23 and pressure regulator valve 24 which are shown in FIG. 2 correspond to the control valve device 22. The transmission gear ratio control valve 23 is a control valve that controls the supply and discharge of hydraulic oil to the actuator 13, and the low-speed clutch solenoid 20 and high-speed clutch solenoid 21 switch the state of hydraulic oil introduced into the low-speed clutch 7 and high-speed clutch 8.

Hydraulic oil that is discharged from an oil pump 25 that is driven by the power that is extracted from the damper 2 is fed to the control valve device 22 and the pressing device 14. In other words, hydraulic oil that is taken up from an oil reservoir 26 (see FIG. 2) and discharged from the oil pump 25 is regulated to a specified pressure by the pressure regulator valve 24. In this example, detection signals from a pair of hydraulic sensors 28a, 28b (illustrated as hydraulic sensor 28 in FIG. 1) that are provided in hydraulic chambers 27a, 27b of the actuator 13 are inputted to the controller 16. Then, based on the pressure difference in the hydraulic chambers 27a, 27b detected by the hydraulic sensors 28a, 28b (the torque that passes though the toroidal continuously variable transmission 4 (passing torque) and that corresponds to this pressure difference), and other quantities (transmission gear ratio, oil temperature, accelerator opening, vehicle speed and the like) that are detected oil temperature sensor 29, input-side rotation sensor 30, output-side rotation sensor 31, output shaft rotation sensor 32, accelerator sensor 33 and the like, the controller 16 switches the opened/closed state of the loading pressure control opening/closing solenoid 18. Then, based on the switching of this opened/closed state, the controller 16 adjusts the opening pressure of the pressure regulator valve 24, and regulates the pressure in the primary line 34 and also the pressure device 14 to a value that is optimal to the operating conditions.

The hydraulic pressure that is regulated by the pressure regulator valve 24 is fed into the hydraulic chambers of the low-speed clutch 7 or high-speed clutch 8 by way of the low-speed clutch solenoid 20 or high-speed clutch solenoid 21. The low-speed clutch 7 is connected when achieving a low-speed mode in which the reduction ratio is increased (including the geared neutral (GN) state in which the transmission gear ratio is infinitely large), and disconnected when achieving a high-speed mode in which the reduction ratio is decreased. On the other hand, the high-speed clutch 8 is disconnected when achieving a low-speed mode, and is connected when achieving a high-speed mode. Switching (opening/closing) of the low-speed clutch solenoid 20 and the high-speed clutch solenoid 21 is controlled by the controller 16.

Figure 3:
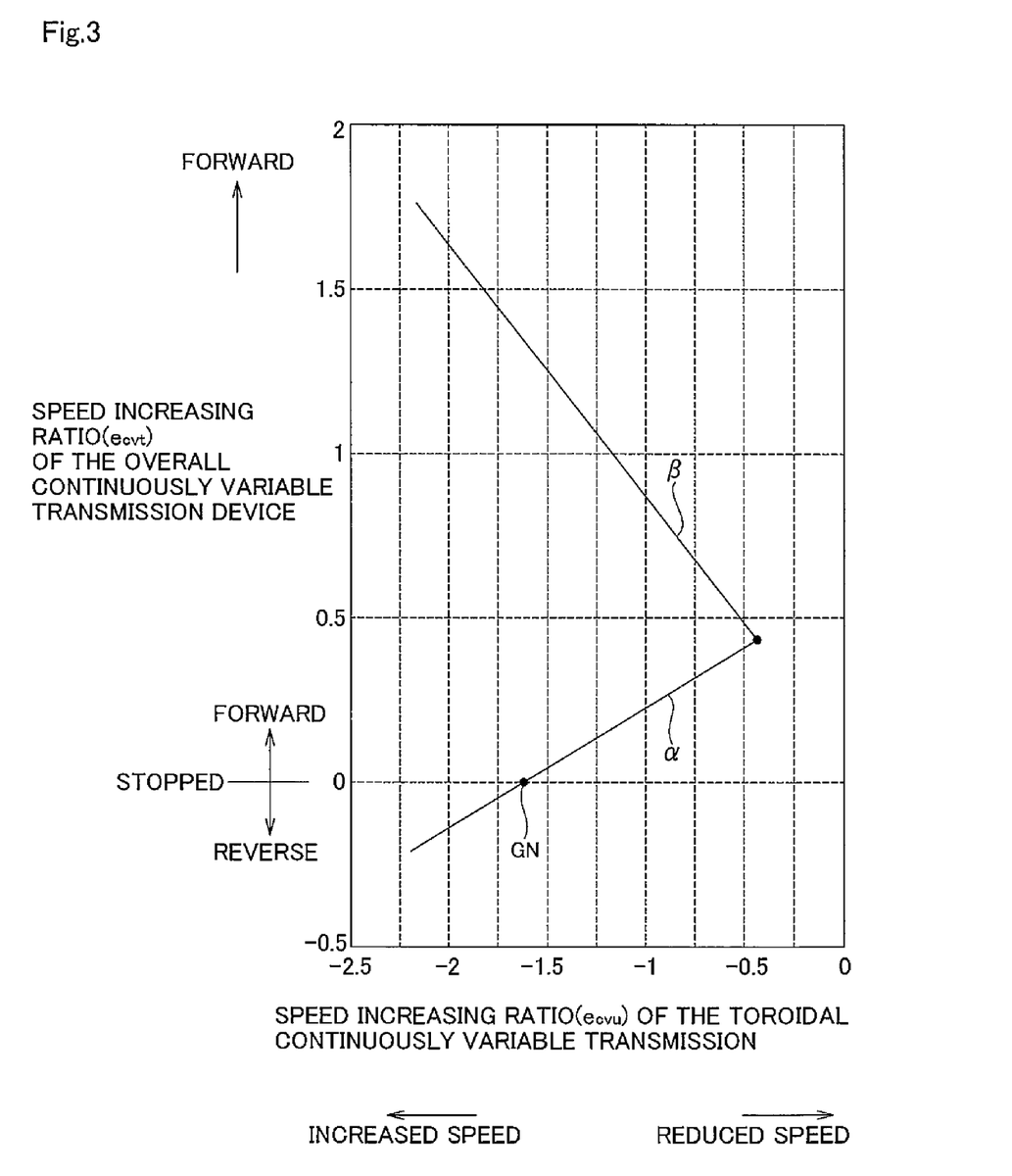
FIG. 3 is a graph illustrating an example of the relationship between the speed ratio of the overall continuously variable transmission device and the transmission gear ratio of a toroidal continuously variable transmission.

FIG. 3 illustrates an example of the relationship between the transmission gear ratio (speed increasing ratio) of the toroidal continuously variable transmission 4, and the speed ratio (speed increasing ratio) of the overall continuously variable transmission device. For example, in the low-speed mode in which the low-speed clutch 7 is connected and the high-speed clutch 8 is disconnected, as illustrated by the solid line α, the more the transmission gear ratio of the toroidal continuously variable transmission 4 is decreased from the value (GN value) where a geared neutral state can be achieved, the more the speed ratio of the overall continuously variable transmission device is increased from the stopped state (state in which the speed ratio is 0) in the forward direction (+: forward rotation direction). Moreover, the more the transmission gear ratio of the toroidal continuously variable transmission 4 increases from the GN value, the more the speed ratio of the overall continuously variable device increases from the stopped state in the reverse direction (−: reverse rotation direction). On the other hand, in the high-speed mode in which the high-speed clutch 8 is connected and the low-speed clutch 7 is disconnected, as illustrated by the solid line β, the more the transmission gear ratio of the toroidal continuously variable transmission 4 increases, the more the speed ratio of the overall continuously variable transmission device increases in the forward direction (+ rotation direction) (a state in which a reduction ratio that is less than in the low-speed mode is achieved).

Generally, the "transmission gear ratio" is a reduction ratio, and the "speed ratio" is a speed increasing ratio, where the inverse of the "transmission gear ratio" is the "speed ratio" ("speed ratio"=1/"transmission gear ratio"). However, in the explanation of the present invention, the term "transmission gear ratio" is used for the ratio between the input side and output side of the toroidal continuously variable transmission, and the term "speed ratio" is used for the ratio between the input side and the output side of the overall continuously variable transmission device. The reason for this is to make it clear whether the ratio is that of the toroidal continuously variable transmission or that of the overall continuously variable transmission device. Therefore, in the explanation of the present invention, the term "transmission gear ratio" does not necessarily correspond to a reduction ratio, and the "speed ratio" does not necessarily correspond to an speed increasing ratio.

In a vehicle in which this kind of continuously variable transmission is assembled, the optimum speed ratio (target speed ratio) of the overall continuously variable transmission device is found by the controller 16 based on the travelling state (operating state) of the vehicle at that instant that is obtained from the operation of the accelerator pedal (accelerator opening) or the traveling speed (vehicle speed) of the vehicle. In order to achieve this target speed ratio, by driving the stepping motor 17 based on a control signal from the controller 16 and switching the transmission gear ratio control valve 22, the transmission gear ratio of the toroidal continuously variable transmission 4 is adjusted to a target transmission gear ratio that corresponds to the target speed ratio. By switching between the low-speed clutch solenoid 20 and high-speed clutch solenoid 21 according to the target speed ratio of the overall continuously variable transmission device, the necessary traveling mode (low-speed mode or high-speed mode) is selected. As a result, the speed ratio of the continuously variable transmission device is adjusted to an optimum value (target speed ratio) according to the traveling state of the vehicle at that instant.

Furthermore, in this example, the controller 16 is given a function (first function) to change the speed ratio of the continuously variable transmission device from a value that corresponds to the traveling state at that time to "0" where a stopped state can be achieved, when the vehicle is traveling and the shift lever that is provided in the driver's side is shifted to a selection position for an direction opposite the traveling direction at that time, and in the state in which the clutch device 6 is connected, or more specifically, the state in which during high speed travel in the forward direction, the transmission gear ratio of the toroidal continuously variable transmission 4 is reduced, and the clutch is switched from the high-speed clutch 8 to the low-speed clutch 7, and this low-speed clutch 7 is connected, or the state in which during low speed travel in the forward direction or travel in the reverse direction, and this low-speed clutch 7 is connected. Moreover, together with this, the controller 16 is also given a function to adjust the speed ratio of the overall continuously variable transmission device to a value that corresponds to the position in which the shift lever is shifted (shift position) after changing the transmission gear ratio to "0" where a stopped state is achieved, or in other words, a function that performs transmission control (at the start of movement) according to this shift position.

When the shift lever is shifted to a forward position (D range, L range), and then while the vehicle is traveling in the forward direction, this shift lever is shifted to a reverse position (R range), the controller 16 changes (reduces) the speed ratio of the overall continuously variable transmission device from a value that corresponds to the forward traveling at that time until it reaches "0", where a stopped state can be achieved. In other words, in the state in which the high-speed clutch 8 is connected, after changing the transmission gear ratio of the toroidal continuously variable transmission 4 to the decelerating side and switching the connection to the low-speed clutch 7, the controller 16 changes the transmission gear ratio to the accelerating side. On the other hand, in the state in which the low-speed clutch 7 is connected, the controller 16 changes the transmission gear ratio as is on the accelerating side. Next, in order to start moving in the reverse direction, the controller 16 adjusts the speed ratio of the overall continuously variable transmission device to a value that corresponds to the reverse position (increases speed in the reverse direction). In other words, the low-speed clutch 7 is connected, so the controller 16 changes the transmission gear ratio of the toroidal continuously variable transmission 4 to the accelerating side.

On the other hand, in a state in which the shift lever has been shifted to a reverse position, and then when this shift lever is shifted to a forward position while the vehicle is traveling in the reverse direction, the controller 16 changes (reduces) the speed ratio of the overall continuously variable transmission device from a value that corresponds to the reverse direction at that time until it reaches "0" where a stopped state can be achieved. In other words, the low-speed clutch 7 is connected, so the controller 16 changes the transmission gear ratio of the toroidal continuously variable transmission 4 to the decelerating side. Next, in order to start moving in the forward direction, the controller 16 adjusts the speed ratio of the overall continuously variable transmission device to a value that corresponds to a forward position (increases speed in the forward direction). In other words, the low-speed clutch 7 is connected, so the controller 16 changes the transmission gear ratio of the toroidal continuously variable transmission 4 to the decelerating side. Then, as necessary, after the clutch connection has been switched to the high-speed clutch 8, the controller 16 changes the transmission gear ratio of the toroidal continuously variable transmission 4 to the accelerating side, and adjusts the speed ratio of the overall continuously variable transmission device to a value that corresponds to a forward position (increases speed in the forward direction), so that a state in which the reduction ratio that is less than in the low-speed mode is achieved. This kind of transmission control is disclosed in detail in JP 2007-309435 (A), so any further explanation will be omitted here.

Particularly, in this example, the controller 16 is given the following function for compensating for this kind of first function. In other words, in this example, the controller 16 is given a second function that, when the traveling speed of a vehicle when the shift lever is shifted to a selection position for the direction opposite the traveling direction at that time is faster than a specified speed (for example, 20 km/h), disconnects the connection of the clutch device 6 (the low-speed clutch 7 and high-speed clutch 8), and furthermore, maintains that disconnected state for a specified amount of time.

Figure 4:
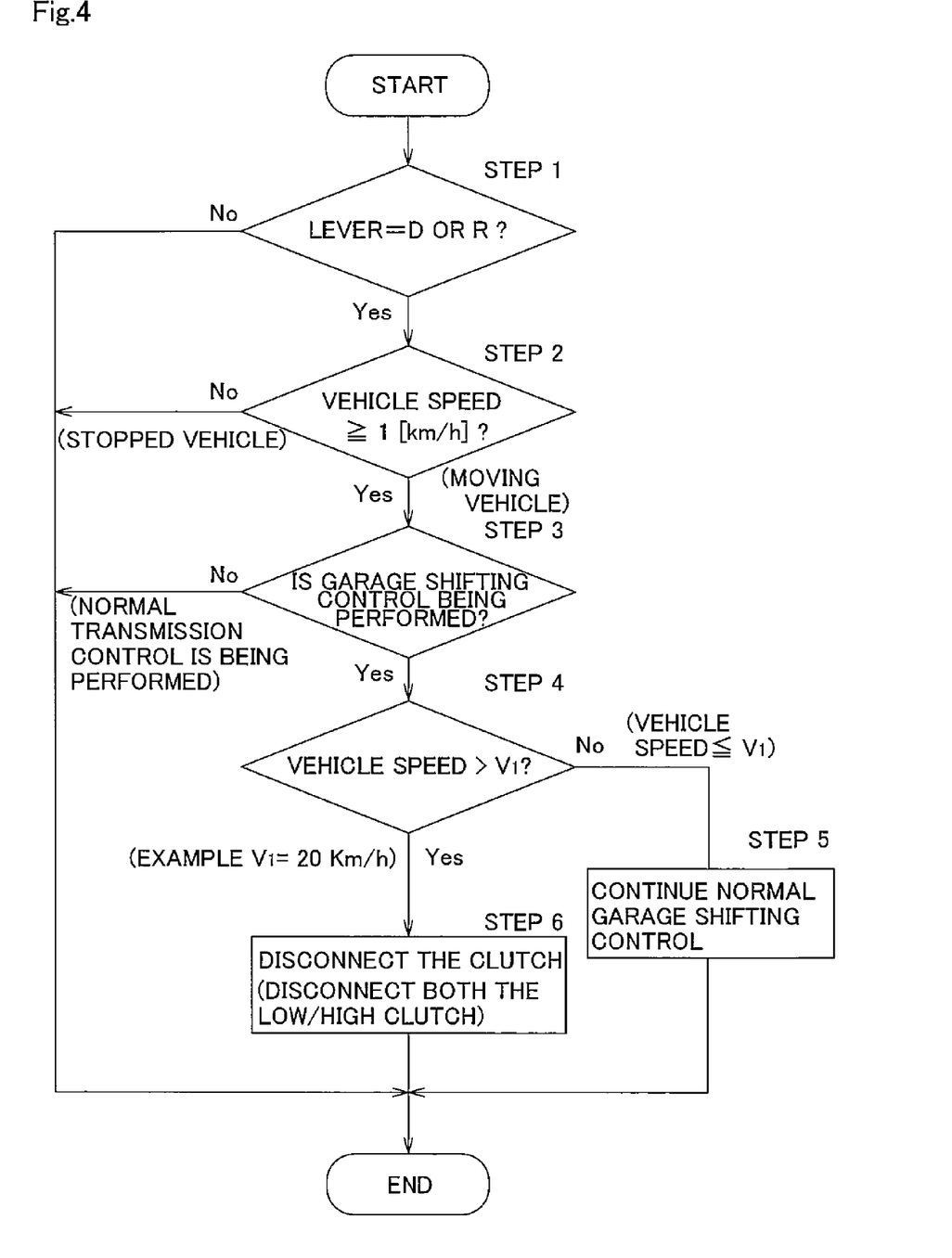
FIG. 4 is a flowchart illustrating the operation of a feature this example.

This second function of the controller 16 will be explained with reference to the flowchart illustrated in FIG. 4. The flowchart that is illustrated in FIG. 4 illustrates a control method for the case in which, during garage shifting control (control is based on the first function), the traveling speed of the vehicle becomes faster than a specified speed (for example, 20 km/h) as the operator presses on the accelerator pedal. Moreover, the work that is illustrated in the flowchart in FIG. 4 is performed repeatedly (automatically) from when the ignition switch is switched ON until it is switched OFF.

First, the controller 16, in step 1, determines whether or not the selected position of the shift lever is in a moving position (for example, D range, L range, R range). This determination is performed, for example, based on a detection signal from a position switch (see FIG. 1) that detects the selected position of the shift lever. In step 1, when it is determined that the selected position of the shift lever is not a moving position, or in other words is a non-moving position (for example, the P range, N range), processing ends, and then returns to the start. On the other hand, in step 1, when it is determined that the selected position of the shift lever is in a moving position, processing advances to step 2.

The controller 16, in step 2, determines whether or not the vehicle is actually traveling. This determination is performed based on the rotational speed of the output shaft 9 that is obtained, for example, from a detection signal from an output-shaft rotation sensor 32. More specifically, the controller 16 determines whether or not the traveling speed of the vehicle is 1 km/h or greater (vehicle speed 1 km/h). In step 2, when it is determined that the vehicle is not moving (the vehicle is stopped), processing ends and returns to the start. However, in step 2, when it is determined that the vehicle is traveling, processing advances to step 3.

The controller 16, in step 3, determines whether or not garage shifting control is currently being performed (whether operation based on the first function is being performed). In other words, the controller 16 determines whether currently, "in a state in which the shift lever is shifted to a selection position that is in the direction opposite the traveling direction at that time, and the clutch device 6 (low-speed clutch 7 or high-speed clutch 8 in FIG. 2) is connected, the speed ratio of the overall continuously variable transmission device is changing from a value that corresponds to the traveling state at that time, to "0" where a stopped state can be achieved". More specifically, the controller 16 determines whether or not the transmission control that is disclosed in FIG. 3 and FIG. 5 of JP 2007-309435 (A) is currently being performed. In step 3, when it is determined that garage shifting control is not currently being performed, processing ends and returns to the start. However, in step 3, when it is determined that garage shifting control is currently being performed, processing advances to step 4.

The controller 16, in step 4, determines whether or not the current traveling speed of the vehicle is faster than a specified speed ($V_1$, for example, 20 km/h). In other words, the controller 16 determines whether or not the traveling speed of a vehicle that is traveling in a state in which the shift lever has been shifted to a selection position of a direction opposite the traveling direction at that time is faster than a specified speed. This determination can also be performed, for example, by using a detection signal from the output shaft rotation sensor 32. In step 4, when it is determined that the traveling speed of the vehicle is equal to or less than the specified speed (for example, equal to or less than 20 km/h), processing advances to step 5.

The controller 16, in step 5, continues normal garage shifting control as it is. In this case, the speed (shifting speed) for which the transmission gear ratio of the toroidal continuously variable transmission 4 (also the speed ratio of the overall continuously variable transmission device) changes during normal garage shifting control is adjusted (tuned) beforehand to a speed at which the vehicle can be stopped safely and quickly (for example, this shifting speed is a speed that corresponds to the traveling speed of the vehicle).

On the other hand, in step 4, when it is determined that the traveling speed of the vehicle is faster than a specified speed (for example, 20 km/h), processing advances to step 6, and the controller 16 disconnects the connection of the clutch device 6 (low-speed clutch 7 and high-speed clutch 8), and maintains the disconnected state for a specified amount of time. In other words, the connection of the clutch device 6 (low-speed clutch 7 and high-speed clutch 8) is maintained in a disconnected state until the traveling speed of the vehicle becomes equal to or less than a specified speed ($V_1$). After the traveling speed of the vehicle has become equal to or less than a specified speed ($V_1$), the controller 16, based on the first function, connects the clutch device 6 (low-speed clutch 7), and changes (reduces) the speed ratio of the overall continuously variable transmission device from a value corresponding to the forward movement at that time, to a value of "0" at which a stopped state can be achieved (executes garage shifting control). In order to disconnect the connection of the clutch device 6 (low-speed clutch 7 and high-speed clutch 8), the controller 16 sends a signal to the low-speed clutch solenoid 20 and high-speed clutch solenoid 21 (see FIG. 2) instructing that the connection of the low-speed clutch 7 and high-speed clutch 8 (see FIG. 2) be disconnected.

With the continuously variable transmission device for a vehicle of the present invention, it is possible to prevent a vehicle from continuing to travel at high speed in the opposite direction of the direction intended by the operator when the shift lever is shifted to a selection position for a direction opposite the traveling direction of the vehicle at that time, or in other words, when garage shifting or shuttle shifting is performed.

That is, in the case of the present invention, when the traveling speed of a vehicle that is traveling (decelerating) based on the first function becomes faster than a specified speed (for example, $V_1=20$ km/h), for example, when the operator increases the accelerator opening (presses the accelerator pedal) in an attempt to more quickly move in the opposite direction, or intends to accelerate the vehicle in the opposite direction, the controller 16 disconnects the connection of the clutch device 6 (low-speed clutch 7 and high-speed clutch 8) that transmits power between the toroidal continuously variable transmission 4, which is a continuously variable transmission mechanism, and the planetary gear transmission 3, which is a differential gear mechanism. As a result, it is possible to prevent more driving force of the engine 1 from being transmitted to the wheels, so it is possible to cause the vehicle to decelerate without accelerating, and prevent the vehicle from continuing to travel at high speed in the direction opposite the direction intended by the operator.

Moreover, in the case of the present invention, when the traveling speed of a vehicle becomes equal to or less than a specified speed ($V_1$), the controller 16, based on the first function, connects the clutch device 6 (low-speed clutch 7), and is able to adjust the speed ratio of the overall continuously variable transmission device to "0" at which it is possible to achieve a stopped state of the vehicle.

Therefore, with the continuously variable transmission for a vehicle of the present invention, when the shift lever is shifted to a selection position for a direction opposite the traveling direction at that time, it is possible to cause the vehicle to decelerate and stop safely and quickly, and then cause the vehicle to quickly move as intended by the operator without sudden changes to the behavior of the vehicle, and without damaging the vehicle.

Moreover, in the present invention, unlike the conventional construction disclosed in JP 2004-190809 (A) and JP 3,924, 164 (B2), there is no increase in the number of parts, and control is not complex, so it becomes easier to ensure reliability. Moreover, because there is no need for complex control, it is possible to prevent the occurrence of control interference. Furthermore, it is possible to achieve behavior according to the operator's intentions, so it is possible to prevent operational error by the operator due to the intentions of the operator not matching the behavior of the vehicle.

Figure 5:
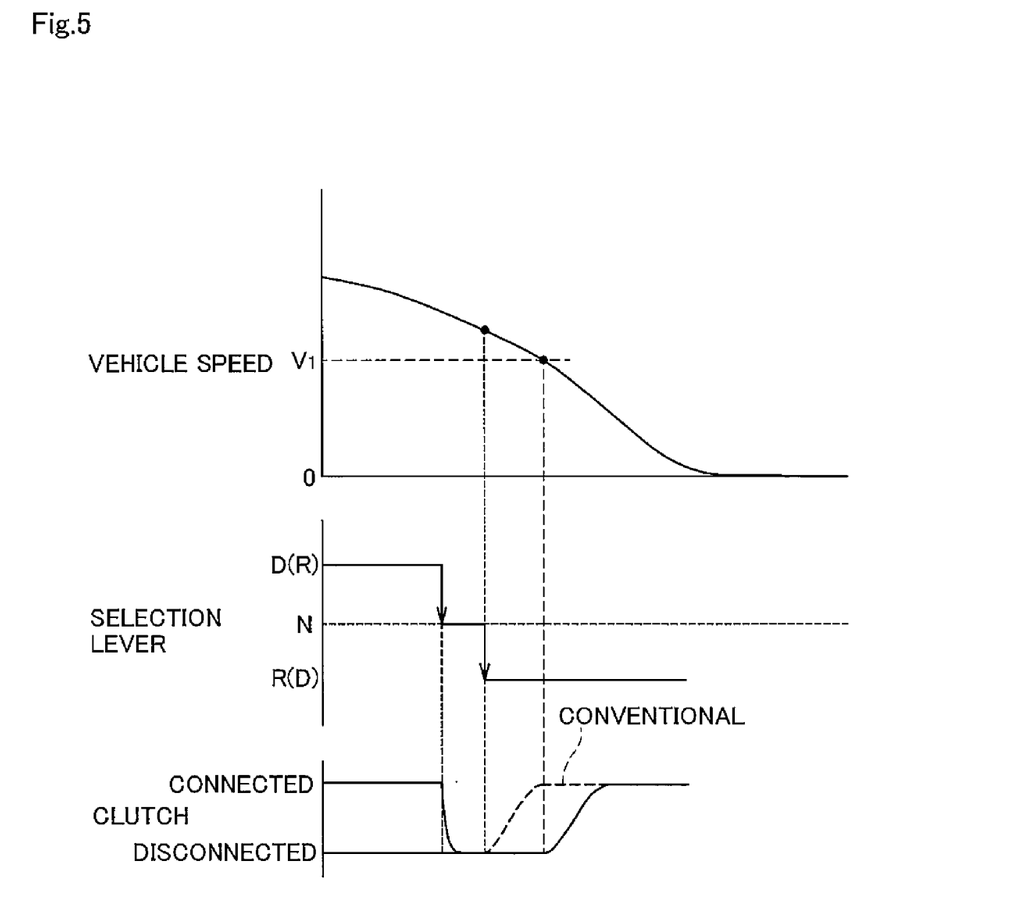
FIG. 5 is a graph illustrating the relationship between the traveling speed of the vehicle, the shift position of the shift lever, and the disconnected/connected state of the clutch.

In the case of embodying the continuously variable transmission device for a vehicle of the present invention, disconnecting the connection of the clutch device 6 (low-speed clutch 7 and high-speed clutch 8) (not connecting the clutch device 6) is not limited to when the traveling speed of the vehicle becomes faster than a specified speed. For example, when the operator shifts the shift lever to a selection position for a direction opposite the traveling direction of the vehicle at that time when in a state of the vehicle traveling faster than a specified speed due to the operator pressing the accelerator pedal or due to traveling downhill, the connection of the clutch device 6 (low-speed clutch 7 and high-speed clutch 8) is immediately disconnected without processing moving to garage shifting control. For example, as illustrated in FIG. 5, in the case that the shift lever is shifted from the D range to the R range by way of the N range (or is shifted from the R range to the D range by way of the N range) when the vehicle is traveling in the forward direction (or the reverse direction) at a speed that is faster than a specified speed ($V_1$), unlike the example of the conventional case illustrated by the dashed line at the bottom of the figure, the clutch device 6 (low-speed clutch 7 and high-speed clutch 8) is not connected even when the shift lever is shifted to the R range (or D range). In other words, in the present invention, as illustrated by the solid line at the bottom of FIG. 5, until the traveling speed of the vehicle drops to become equal to or less than a specified speed ($V_1$), the disconnected state of the clutch device 6 (low-speed clutch 7 and high-speed clutch 8) is maintained, and then after the traveling speed of the vehicle has become equal to or less than the specified speed ($V_1$), the clutch device 6 (low-speed clutch 7) is connected, and the speed ratio of the overall continuously variable transmission device is changed (reduced) from a value that corresponds to forward traveling at that time until it becomes "0" at which a stopped state can be achieved (garage shifting control is executed).

In the case of embodying the continuously variable transmission device for a vehicle of the present invention, it is possible to apply a decelerating force to the vehicle when the clutch device is disconnected. It is possible to use a brake device such as a service brake, exhaust brake or the like as device for applying a decelerating force to the vehicle in this way. In that case, it is possible to use a brake device that is already equipped in the vehicle, so it is possible to prevent an increase in the cost of the device.

It is also possible to use a regenerative device as the device for applying a decelerating force to the vehicle, that, by applying a decelerating force, stores reusable energy (for example, a flywheel that saves energy as torque, or an electric motor that performs regenerative braking). In that case, quick deceleration is performed when the shift lever is shifted to a selection position for the direction opposite the traveling direction of the vehicle at the time (when garage shifting, shuttle shifting is performed). Moreover, when using a regenerative device that stores reusable energy that is obtained by applying a decelerating force as a device for applying a decelerating force, it is possible to use the decelerating energy as a driving force when starting to move (accelerate) in the same direction as the selection position of the shift lever after the speed been changed to "0" at which a stopped state can be achieved, and thus it is possible to improve in fuel efficiency (energy saving).

It is also possible to provide a forward/reverse switching mechanism as needed (for example, a forward clutch and reverse clutch) that switches the rotating direction of the output shaft of the continuously variable transmission device. In that case, this switching of this forward/reverse switching mechanism (disconnecting/connecting the clutch) is performed in a state in which the speed of the vehicle is "0" (geared neutral state). By providing this forward/reverse switching mechanism, in a construction that is capable of achieving geared neutral (GN), it is possible to increase the fluctuation range (transmission width) of the speed ratio on the forward side as well as on the reverse side.

EXPLANATION OF REFERENCE NUMBERS

1 Engine
2 Damper
3 Input shaft
4 Toroidal continuously variable transmission
5 Planetary gear transmission
6 Clutch device
7 Low-speed clutch
8 High-speed clutch
9 Output shaft
10 Input-side disk
11 Output-side disk
12 Power roller
13 Actuator
14 Pressing device
15 Transmission ratio control unit
16 Controller
17 Stepping motor
18 Loading pressure control opening/closing solenoid
19 Mode switching control opening/closing solenoid
20 Low-speed clutch solenoid
21 High-speed clutch solenoid
22 Control value device
23 Transmission gear ratio control valve
24 Pressure regulator valve
25 Oil pump
26 Oil reservoir
27a, 27b Hydraulic chamber
28a, 28b Hydraulic sensor
29 Oil temperature sensor
30 Input-side rotation sensor
31 Output-side rotation sensor
32 Output shaft rotation sensor
33 Accelerator sensor
34 Primary line
35 Manual hydraulic switching valve
36 Reducing valve
37 Position switch

What is claimed is:

1. A continuously variable transmission device for a vehicle, comprising:
    a continuously variable transmission mechanism;
    a differential gear mechanism that includes a combination of a plurality of gears;
    a clutch device that switches the power transmission path between the continuously variable transmission mechanism and the differential gear mechanism; and
    a controller that switches the operation of the continuously variable mechanism, differential gear mechanism and clutch device, in which
    by changing the relative displacement speed of the plurality of gears of the differential gear mechanism based on adjustment of the transmission gear ratio, which is the ratio between the input-side and output-side of the continuously variable transmission mechanism, it is possible to change the rotating state of the output shaft between a forward state and reverse state with a stopped state in between, with the input shaft rotating in one direction as is by a drive source,
    the controller having:
    a first function that, when a shift lever is shifted to a selection position for a direction opposite the traveling direction at that time, and with the clutch device connected, changes the speed ratio, which is the ratio between the input side and output side of the overall continuously variable transmission device, from a value that corresponds to the traveling state at that time, to "0" at which a stopped state can be achieved; and
    a second function that, when the shift lever is shifted to a selection position for a direction opposite the traveling direction at that time, and when the traveling speed of the vehicle is faster than a specified speed, disconnects the clutch device.

2. The continuously variable transmission device for a vehicle according to claim 1, wherein
    the controller, maintains the clutch device in a disconnected state while the traveling speed of the vehicle is faster than the specified speed, and then when the traveling speed of the vehicle becomes equal to or less than the specified speed, based on the first function, connects the clutch device and adjusts the speed ratio of the overall continuously variable transmission device to "0" at which a stopped state of the vehicle can be achieved.

3. The continuously variable transmission device for a vehicle according to claim 1, wherein
    the continuously variable transmission mechanism is a toroidal continuously variable transmission, and this toroidal continuously variable transmission is capable of switching between a low-speed mode and a high-speed mode by switching a connected mode and a disconnected mode of the clutch device, in which the low-speed mode, by adjusting the transmission gear ratio of this toroidal continuously variable transmission and changing the relative displacement speed of the plurality of gears of the differential gear mechanism, is able to change the rotating state of the output shaft between a forward rotating state and reverse rotating state with a stopped state in between, with the input shaft rotating in one direction as is by the drive source, and the high-speed mode, by changing the transmission gear ratio of the toroidal continuously variable transmission without changing the rotating state of the output shaft, changes the speed ratio of the overall continuously variable transmission device.

* * * * *